(12) United States Patent
Carter et al.

(10) Patent No.: US 8,229,743 B2
(45) Date of Patent: Jul. 24, 2012

(54) SPEECH RECOGNITION SYSTEM

(75) Inventors: David Carter, Cambridge (GB);
Mahapathy Kadirkamanathan, Cambridge (GB)

(73) Assignee: Autonomy Corporation Ltd., Cambridge (GB)

(*) Notice: Subject to any disclaimer, the term of this patent is extended or adjusted under 35 U.S.C. 154(b) by 643 days.

(21) Appl. No.: 12/489,786

(22) Filed: Jun. 23, 2009

(65) Prior Publication Data

US 2010/0324901 A1    Dec. 23, 2010

(51) Int. Cl.
*G10L 15/00* (2006.01)

(52) U.S. Cl. ........................ 704/251; 704/255

(58) Field of Classification Search .................. 704/251, 704/255
See application file for complete search history.

(56) References Cited

U.S. PATENT DOCUMENTS

| | | | |
|---|---|---|---|
| 4,761,815 A | 8/1988 | Hitchcock | |
| 5,636,325 A | 6/1997 | Farrett | |
| 5,832,425 A | 11/1998 | Mead | |
| 6,092,034 A * | 7/2000 | McCarley et al. | 704/2 |
| 6,188,976 B1 | 2/2001 | Ramaswamy et al. | |
| 6,668,256 B1 | 12/2003 | Lynch | |
| 7,206,303 B2 | 4/2007 | Karas et al. | |
| 7,272,594 B1 | 9/2007 | Lynch et al. | |
| 7,292,979 B2 | 11/2007 | Karas et al. | |
| 7,406,408 B1 | 7/2008 | Lackey et al. | |
| 7,478,038 B2 | 1/2009 | Chelba et al. | |
| 2002/0111806 A1 * | 8/2002 | Franz et al. | 704/255 |
| 2005/0234722 A1 | 10/2005 | Robinson et al. | |
| 2008/0255844 A1 | 10/2008 | Wu | |
| 2011/0172988 A1 * | 7/2011 | Wang et al. | 704/9 |

FOREIGN PATENT DOCUMENTS

| | | |
|---|---|---|
| EP | 1 484 774 A1 | 12/2004 |
| GB | 2354101 A | 3/2001 |
| GB | 2381638 A | 5/2003 |
| GB | 2381688 A | 5/2003 |
| GB | 2388738 A | 11/2003 |
| GB | 2388739 A | 11/2003 |
| GB | 2457855 A | 9/2009 |
| GB | 2465383 A | 5/2010 |
| GB | 2468203 A | 9/2010 |
| WO | WO 2008/124368 A1 | 10/2008 |

OTHER PUBLICATIONS

United Kingdom Intellectual Property Office, Search Report for UK Patent Application No. GB 1003097.1, May 13, 2010, 4 pages.

(Continued)

*Primary Examiner* — Daniel D Abebe
(74) *Attorney, Agent, or Firm* — Rutan and Tucker, LLP

(57) ABSTRACT

Various methods and apparatus are described for a speech recognition system. In an embodiment, the statistical language model (SLM) provides probability estimates of how linguistically likely a sequence of linguistic items are to occur in that sequence based on an amount of times the sequence of linguistic items occurs in text and phrases in general use. The speech recognition decoder module requests a correction module for one or more corrected probability estimates $P'(z|xy)$ of how likely a linguistic item z follows a given sequence of linguistic items x followed by y, where (x, y, and z) are three variable linguistic items supplied from the decoder module. The correction module is trained to linguistics of a specific domain, and is located in between the decoder module and the SLM in order to adapt the probability estimates supplied by the SLM to the specific domain when those probability estimates from the SLM significantly disagree with the linguistic probabilities in that domain.

20 Claims, 4 Drawing Sheets

OTHER PUBLICATIONS

United Kingdom Intellectual Property Office, Search Report for UK Patent Application No. GB 100758.4, Sep. 3, 2010, 4 pages.

United Kingdom Intellectual Property Office, Search Report for UK Patent Application No. GB 1010370.3, Oct. 15, 2010, 4 pages.

Iyer, Rukmini et al., "Using Out-of-Domain Data to Improve In-Domain Language Models," IEEE Signal Processing Letters, vol. 4, No. 8, Aug. 1997, pp. 221-223.

Gale, William A., et al., "Good-Turing Frequency Estimation Without Tears," http://www.grsampson.net/AGth.html, May 1, 2009, pp. 1-23.

Rapajic, Uros, "Using Phone Recognition and Language Modelling (PRLM) for Automatic Language Identification," http://www.doc.ic.ac.uk/~nd/surprise_96/journal/vol12/ur1/article2.html, 1996, 8 pages.

* cited by examiner

SPEECH RECOGNITION SYSTEM

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to speech recognition, text compression, language identification and cryptography. More particularly, an aspect of an embodiment of the invention relates to speech recognition using a run-time correction module to improve the probability estimates supplied by an underlying statistical language model.

BACKGROUND OF THE INVENTION

Two types of speech recognition systems can be used today. A continuous speech recognition system is used that receives continuous voice communications as an audio file input or directly from a microphone. A paused voice command input speech recognition system is also used. Examples of continuous voice communications are audio files of phone conversations, audio files of radio and television shows, and other continuous flowing spoken words files. In continuous voice communications, two separate words may be uttered as close enough in time to confusion a recognition system into having decide whether a single word or two discrete words where in fact uttered. The system uses the probabilities of words being used in combination to determine whether the single word or two discrete words were in fact uttered. Paused voice command systems are created to substantially eliminate the possibility of this problem from occurring. Typically, in a continuous speech recognition system there is no a priori knowledge to base a guess on what supplied uttered word is trying to be identified/recognized. Also, generally in a continuous speech recognition system the possible vocabulary of words and sounds that can uttered is extremely large. In opposite, a paused voice command input speech recognition system has an a priori knowledge of what possible words will be uttered. The paused voice command input speech recognition system typically has a database of a small set of possible words and sounds that can be uttered from which the system is supposed to recognize. In continuous speech, it is nearly impossible to predict ahead of time when the beginning and ending of words in the stream of continuous speech will individually begin and stop.

SUMMARY OF THE INVENTION

Various methods and apparatus are described for a continuous speech recognition system, a speech recognition decoder module, a statistical language model, an output module, and a run-time correction module. In an embodiment, the underlying statistical language model provides probability estimates $P(z|Y)$ of how likely it is that specific words z (or other linguistic units such as a letters or phones) will occur in a given context (immediately following a specific sequence Y one or more of other linguistic units) based on the number of times those sequences and others occur in the text on which the model has been trained. The speech recognition decoder module requests a run-time correction module for one or more corrected probability estimates $P'(z|Y)$ of how likely it is that a linguistic item z follows a given sequence of linguistic items Y, where Y, and z are supplied by the decoder module. The run-time correction module may be trained on different or more extensive data than the underlying statistical language model, and is located in between the speech recognition decoder module and the underlying model in order to modify the probability estimates supplied by the general-corpus statistical language model when those probability estimates significantly disagree with the evidence available to the correction module. In response to each request by the decoder module, the correction module returns to the decoder module a corrected probability estimates $P'(z|Y)$ of how likely z is to follow the given sequence of linguistic items Y based on whether the probability estimates from the underlying statistical language model agree or significantly disagree with the evidence available to the correction module.

BRIEF DESCRIPTION OF THE DRAWINGS

The drawings refer to embodiments of the invention in which.

Figure 1:
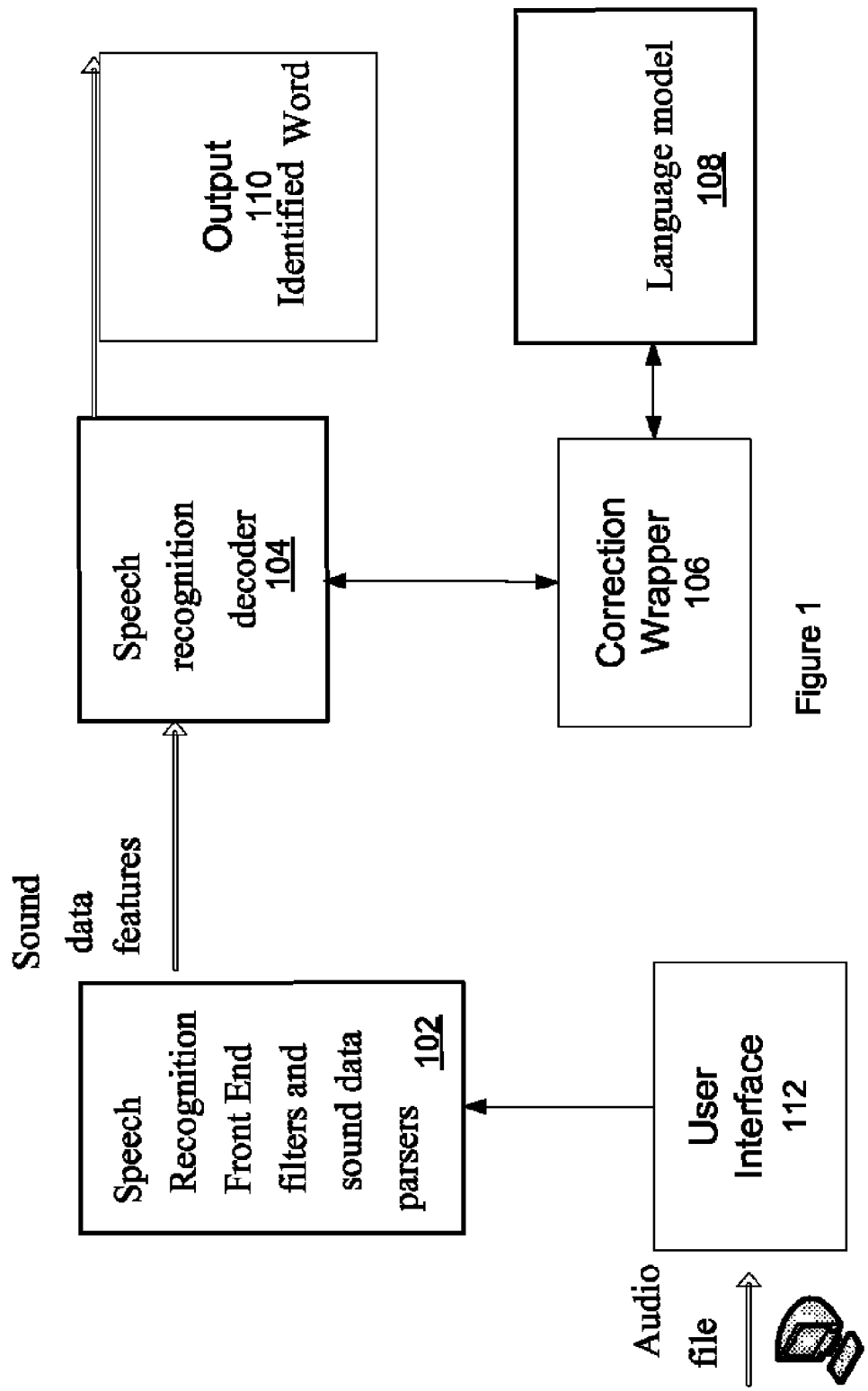
FIG. 1 illustrates a block diagram of an embodiment continuous speech recognition engine.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of formulas, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first input, may be made. However, the specific numeric reference should not be interpreted as a literal sequential order but rather interpreted that the first input is different than a second input. Further steps performed in one embodiment may be also be combined with other embodiments. Thus, the specific details set forth are merely exemplary. The specific details may be varied from and still be contemplated to be within the spirit and scope of the present invention.

In general, various methods and apparatus are described for a speech recognition system. In an embodiment, a continuous speech recognition engine includes various components that includes front end filters, a speech recognition decoder module, a statistical language model, an output module, and a run-time correction module. The statistical language model provides probability estimates of how linguistically likely a sequence of linguistic items are to occur in that sequence based on an amount of times the sequence of linguistic items occurs in text and phrases in general use. Thus, the underlying statistical language model provides probability estimates $P(z|Y)$ of how likely it is that specific words z (or other linguistic units such as a letters or phones) will occur in a given context (immediately following a specific sequence Y of one or more other linguistic units) based on the number of times those sequences and others occur in the text on which the underlying statistical language model has been trained. The speech recognition decoder module requests a run-time correction module for one or more corrected probability estimates $P'(z|Y)$ of how likely it is that a linguistic item z follows a given sequence of linguistic items Y, where Y and z are supplied by the decoder module. A more specific example with three variables x, y, and z will be used herein after with each variable (x, y, or z) merely corresponding to a single linguistic unit such as a word in order to convey this concept in simpler terms. However, the invention is not limited to each variable (x, y, or z) merely corresponding to a single linguistic unit rather z can refer to one or more linguistic units and Y can refer to one or more linguistic units in a given sequence. The speech recognition decoder module requests a run-time correction module for one or more corrected probability estimates $P'(z|xy)$ of how likely a linguistic item z follows a given sequence of linguistic items x followed by y, where (x, y, and z) are three variable linguistic items supplied from the decoder module. The run-time correction module is trained to linguistics of a specific domain, and is located in between the decoder module and the statistical language model in order to adapt the probability estimates supplied by the general-corpus statistical language model to the specific domain (specific field of interest) when those probability estimates from the general-corpus statistical language model significantly disagree with the linguistic probabilities in that domain.

Examples of the use of the correction module include, but are not exhausted by: adapting an underlying model trained on a general or varied text corpus to be more accurate for a specific domain (as discussed above); extending an underlying model to take account of larger contexts when estimating probabilities; and compensating for inaccuracies in the probability-smoothing algorithm used by the underlying model. The run-time correction module is trained on different or more extensive data than the underlying statistical language model. The example of correction module correcting for domain specific information to illustrate the concepts herein but those concepts can be equally applied to the above examples of training on larger context, different context, and other similar equivalent situations.

FIG. 1 illustrates a block diagram of a continuous speech recognition engine. The continuous speech recognition engine 100 at least includes front-end filters and sound data parsers 102, a speech recognition decoder module 104, general-corpus statistical language model 108, a run-time correction module 106, an output module of the speech recognition system 110, and a user interface 112.

The user interface 112 of the continuous speech recognition system has an input to receive the supplied audio files from a client machine over the wide area network and supply the supplied audio files to the front end filters 102. Note the input could equally as well come from a live microphone or other similar device.

The speech recognition front-end filters and sound data parsers 102 convert the supplied audio file of a continuous voice communication into a time-coded sequence of sound feature frames for speech recognition. The front end filters 102 filter out the background noise from the audio file, parse the sounds within the audio file to discrete phonemes (as known and referred herein as phones) and assign a common time code to the audio sounds occurring in supplied file. The front-end filters 102 also transform the audio sounds into a sequence of sound feature frames, which include sound vectors, which in essence capture the data vectors of the sounds.

In an embodiment, when a person speaks, vibrations in the air can be captured as an analog signal. The analog signal may be the supplied audio file. An analog-to-digital converter (ADC) translates this analog wave into digital data that the engine can understand. To do this, the front end filters 102 sample, or digitize, the sound by taking precise measurements of the wave at frequent intervals. The front end filters 102 filter the digitized sound to remove unwanted noise, and sometimes to separate it into different bands of frequency (as differences in human pitch).

The speech recognition decoder module 104 receives the time-coded sequence of sound feature frames from the front-end filters 102 as an input. The speech recognition decoder module 104 applies a speech recognition processes to the sound feature frames. The speech recognition decoder module 104 recognizes the sound feature frames as a word in a particular human language and sub dialect of that human language. The speech recognition decoder module 104 then associates these language parameters with the recognized word, together with a start and end time as the recognized word outputted from the speech recognition decoder module 104. The speech recognition decoder module 104 determines at least one or more best guesses at each recognizable word that corresponds to the sequence of sound feature frames. The speech recognition decoder module 104 supplies the one or more best guesses at the identified word resulting from the speech recognition process to the general-corpus statistical language model 108 via a run-time correction module 106.

In an embodiment, the speech recognition decoder module 104 may be any standard speech recognition tool that outputs its one or more best guesses as an identified/recognized word that corresponds to the word uttered in the audio file.

The general-corpus statistical language model 108 provides probability estimates of how linguistically likely a sequence of linguistic items are to occur in that sequence based on an amount of times the sequence of linguistic items occurs in text and phrases in general use.

The run-time correction module 106 adapts the probability estimates supplied by the general-corpus statistical language model to the specific domain (specific field of interest) when those probability estimates from the general-corpus statistical language model disagree by at least a threshold value (t) with the linguistic probabilities in that domain. The threshold value (t) is an amount set by a user or derived through a sequence of steps and essentially determines whether the statistical language models are consistent or not with the evidence available to the correction module. Thus, the threshold value (t) can be an established criterion that may include a sequence of steps (perhaps) based on a statistical test to create the threshold value (t). In an embodiment, the threshold value (t) is derived from being discrepant with the counts of the items concerned observed in a corpus representative of the domain, where the definition of 'discrepant' is a matter of implementation, but will usually involve the use of a statistical test of the likelihood of those counts given the general model's probability estimate." More on the determination of example implementations of threshold value (t) are described later.

The correction module 106 wants to identify special N-gram words, where the special N-gram words are identified by having a much higher or much lower occurrence in the domain specific text analyzed compared to a typical occurrence of that sequence of words found in general population use.

The statistical language model 108 in cooperation with the run-time correction module 106 supplies to the decoder module 104 probabilities of how linguistically likely a particular uttered word is to follow an identified sequence of a block of one or more words uttered just prior to the particular last uttered word, corrected to a particular domain. That is how likely guessed at blocks of uttered words combine/fit together to form the actual combination of uttered words. The probability of a sequence of words occurring together is calculated by multiplying word combinations formed into interlocking blocks and computing the linguistically likely probability that the guessed at blocks of uttered words combine/fit together to form the actual combination of uttered words.

The output module of the speech recognition system 110 is configured to provide a representation of what uttered sounds and words were inputted into the speech recognition system based on the domain corrected probability estimates.

Figure 2:
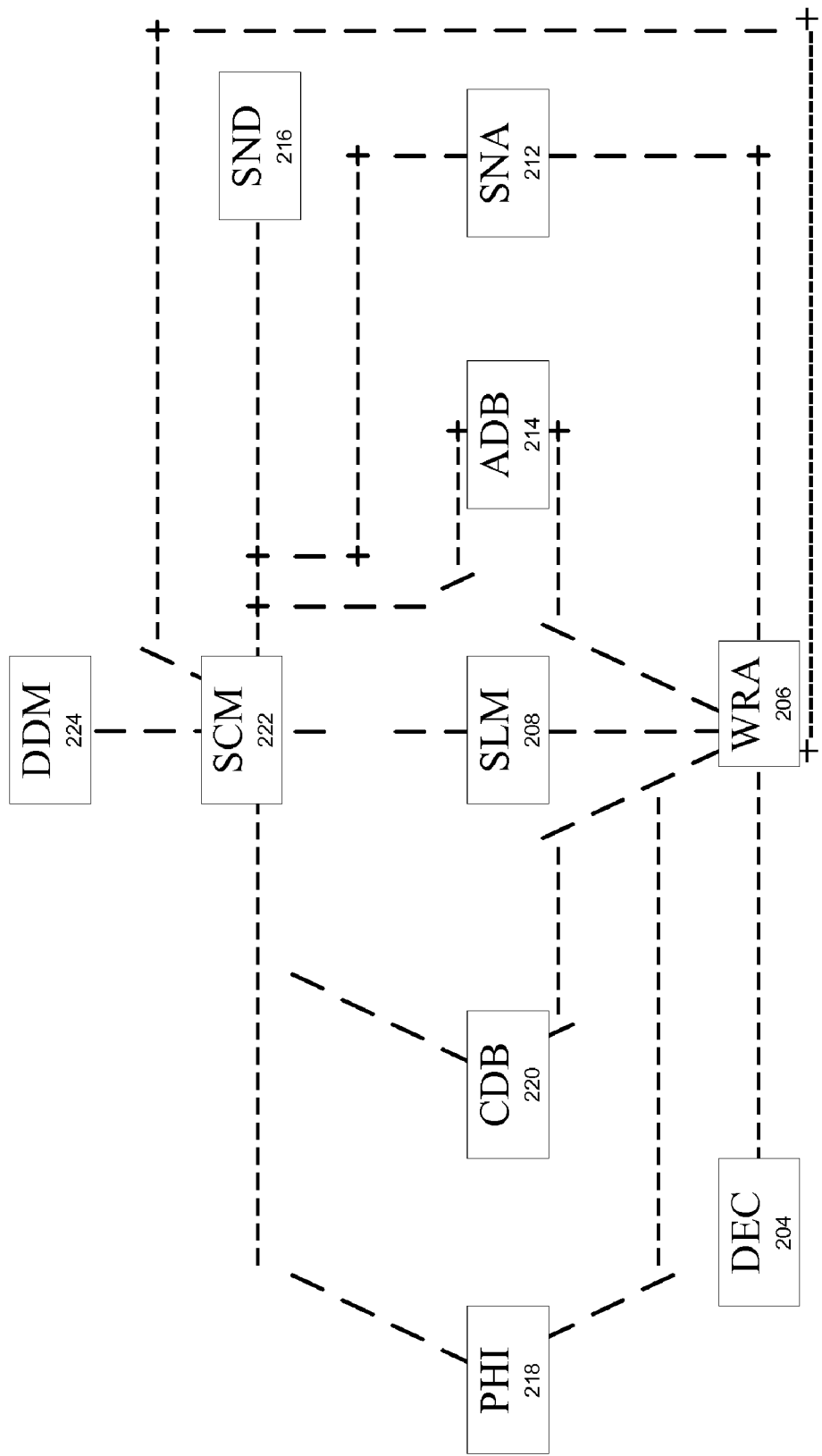
FIG. 2 illustrates a block diagram of an embodiment of a general-corpus statistical language model having its supplied probability estimates adapted to a specific linguistic domain when those probability estimates from the general-corpus statistical language model significantly disagree with the linguistic probabilities in that domain.

FIG. 2 illustrates a block diagram of an embodiment of a general-corpus statistical language model having its supplied probability estimates adapted to a specific linguistic domain when those probability estimates from the general-corpus statistical language model significantly disagree with the linguistic probabilities in that domain.

The proposed process contains of a training phase, when various statistics are gathered, and a run-time speech recognition phase, when corrected probability estimates, based on these statistics, are provided to the speech-recognition decoder on demand. During this training phase, the databases a special N-gram repository 212 of sequences of linguistic items, the adjusted counts database 214, a special N-gram decremented database 216, and a Phi database of normalization values 218 are populated with data. The run-time correction module 206 has two way communications with the statistical language model 208, the Phi database of normalization values 218, the domain specific counts database 220, the special N-gram repository of sequences of linguistic items 212, the adjusted counts database 214, and the speech recognition decoder module 204.

The wrapper module 206 aims to correct the predictions of the general corpus statistical language model (SLM) 208. The general-corpus statistical language model 208 provides probability estimates of how linguistically likely a sequence of linguistic items are to occur in that sequence based on an amount of times the sequence of linguistic items occurs in text and phrases in general use. When queried with a context xy and a word z that may immediately follow that context, the statistical language model 208 can return an estimate P(z|xy) of the probability that z does follow xy. The general-corpus statistical language model 208 provides probability estimates P(z|xy) for the set of linguistic items z that may follow the given sequence of linguistic items x followed by y, and also references a threshold (t), to return the set of linguistic items z such that probability estimate P(z|xy) is greater than or equal to threshold (t).

The speech recognition decoder module 204 (DEC) of the speech recognition system runs the speech recognition process. The speech recognition decoder module 204 requests a run-time correction module 206 for one or more corrected probability estimates P'(z|xy) of how likely a linguistic item z follows a given sequence of linguistic items x followed by y; where (x, y, and z) are three variable linguistic items supplied from the decoder module 204. The decoder module 204 has an input to receive back the one or more domain correct probability estimates from the run-time correction module 206 for one or more possible linguistic items z that follow the given sequence of linguistic items x followed by y.

The units of the linguistic items xyz are phones, words, word phrases, or a combination of both. For simplicity, the discussion will assume z, x and y are words. For example, a sequence of three word or word phrases xyz in context of the previously uttered two words xy starting that sequences of words. The sequence may be "blood sucking lawyer."

The domain/specific field of interest, may be the language type as well as a content specific domain. i.e. the news domain is different from the air travel information domain. A language model 208 trained on a news wire or other general text may not perform very well in an air travel information specific domain.

The run-time correction module (WRA) 206 is trained to linguistics of a specific domain, and is located in between the speech recognition decoder module 204 and the statistical language model 208. The first input in the run-time correction module 206 is configured to receive requests from the decoder module 204 to return the one or more domain correct probability estimates for the one or more possible linguistic items z that could follow the given sequence of linguistic items x followed by y. The run-time correction module 206 adapts the probability estimates supplied by the general-corpus statistical language model 208 to the specific domain (specific field of interest) when those probability estimates from the general-corpus statistical language model 208 significantly disagree by at least a threshold value (t) with the linguistic probabilities in that domain.

A second port in the run-time correction module 206 queries the statistical language model 208 with xyz and then receives from the statistical language model 208 one or more probability estimates P(z|xy) of how likely are each of the possible linguistic items z that could follow the given sequence of linguistic items x followed by y.

An output in the run-time correction module 206 returns to the decoder module 204 one or more domain corrected probability estimates P'(z|xy) of how likely are each of the possible linguistic items z that could follow the given sequence of linguistic items x followed by y.

The output module of the speech recognition system is configured to provide a representation of what uttered sounds and words were inputted into the speech recognition system based on the domain corrected probability estimates supplied to the decoder module 204.

The special N-gram repository 212 (SNA) couples to the run-time correction module 206. The special N-gram repository 212 acts as a repository to store all special N-grams, sequences of linguistic items xyz, that have significantly different counts/occurrences in the corpus of domain specific text analyzed than would be expected compared to a background training data from the general-corpus statistical language model 208 indicative of text phrases in general use. The special N-grams (xyz) are three or more linguistic items in that sequence and are stored along with the actual counts of the number of times that N-gram appeared in the corpus of domain specific text analyzed. Thus, the SNA repository 212 of "special" N-grams (xyz) stores N-grams for which the discrepancy detection module (DDM) 224 has determined that the probability estimate P(z|xy) to be supplied from the SLM 208 is not a plausible estimate given the actual counts of C(xy) and C(xyz) appeared in the corpus of domain specific text analyzed. The special N-gram repository 212 when queried with a linguistic sequence of xyz returns whether the N-gram xyz is included in the repository database and the observed counts associated with that special N-gram (xyz). The SNA also contains a record, for each count value r, of how many of its "special" N-grams xyz have that count, i.e. are such that C(xyz)=r. where C(xy) is the observed counts of a sequence xy and where C(xyz) is the observed count of a sequence xyz.

Here are examples of three word level N-grams (and counts of the number of times they appeared in the general use SLM): Blood sucking vampire (55), Blood sucking mosquito (35), Blood sucking lawyer (10), Blood sucking barrister (0).

Here are examples of three word level N-grams and counts of the number of times they appeared they appeared in the legal specific domain counts database: Blood sucking vampire (0), Blood sucking mosquito (1), Blood sucking lawyer (24), Blood sucking barrister (2).

Thus, the likely probability of phrases formed with the N-gram containing 'blood sucking' varies significantly depending upon the specific domain.

The count database (CDB) 220 couples to the run-time correction module 206. The count database 220 is a pre-populated database specific to a linguistic domain that contains at least the number of counts that the sequence of linguistic items x followed by y occurs in the overall corpus of domain-specific text from this domain analyzed C(xy), as well as the number of counts C(xyz) the N-grams (xyz), sequences of linguistic items of x followed by y followed by z, occurs in the overall corpus of domain-specific text from this analyzed domain. The count database 220 returns the linguistic sequences of xy, the N-gram (xyz), and the observed counts of both C(xy) and C(xyz) in the corpus of domain-specific text analyzed when requested by the run-time correction module 206 or statistical language correction module 222, but is not itself modified either during a training time or at run time, the CDB contains C(X) for all sequences X (with positive counts) up to a certain length N (which we are taking as 3 in our example explanation). Accordingly, the count database 220 contains C(xy) and C(z) for all contexts xy and word z, as well as C(.) the total word count of the corpus of domain specific text analyzed. The linguistic sequences and the associated count data created from the analysis is stored in the count database 220 to form a count database 220 of N-grams for a specific domain. Depending on size requirements, the CDB 220 and the other databases described below may each be implemented as simple in-memory lookup tables, as relational databases on disk, or with any other standard technology.

The Phi database of normalization values (Phi) 218 couples to the run-time correction module 206. The Phi database of normalization values 218 stores normalization values Phi(xy) for contexts of given linguistic items x followed by y. Phi(xy) is used to normalize probability estimates (not counts) from the underlying (general) SLM for those z for which Yz is not a special N-gram. The Phi database 218 applies a mathematical factor to correct the probability estimates in raw form from a domain specific count database 220 to have normalizes probabilities so the sum for the set of all returned possibilities for the z that the decoder is asking about is equal to 100 percent. The sum for the set of all returned possibilities for z is equal to the number one (i.e. 100 percent) and the probabilities for each member in the set has to be adjusted in light of each other to equal to 100 percent as a sum total. Thus, for every context xy, the sum of the returned corrected probability estimates P'(z|xy) over every word z in the vocabulary is one.

The adjusted counts database 214 couples to the run-time correction module 206. The adjusted counts database 214 stores values of smoothed C'(xy) for contexts xy. The counts in raw form for contexts xy are mathematically adjusted so the number zero is not used to determine a probability estimate associated with a special N-gram stored in the special N-gram repository 212, rather a number near zero but not zero is used to readjust the probability estimate.

During runtime, the run-time correction module 206 receives an input from the statistical language model 208 and the Phi database 218, the counts database 220, the adjusted counts database 214, the special N-gram repository 212, and the decoder module 204. The speech recognition decoder module 204 sends to the first input of the run-time correction module 206 the given sequence of words xy that is identified as being correct, and asks what is the probability of each linguistically possible word z for each of the individual block combinations of xy and z. The run-time correction module 206 calculates corrected probability estimates P'(z|xy) 1) that are approximately equal to the SLM's estimates P(z|xy) when P(z|xy) is plausible, and 2) to C(xyz)/C(xy) when it is not.

The run-time correction module 206 first determines whether each possibility of the linguistic sequence xy and z is a special N-gram listed in the special N-gram repository 212 or not. When the sequence of linguistic items xyz is a special N-gram, then the correction module 206 generates a corrected probability estimate directly from the observed counts in that domain and discards the predictions from the general-corpus statistical language model 208 for that xyz possibility. When the special N-gram xyz is not in the special N-gram repository 212, then the run-time correction module 206 applies a normalization factor to estimates from the statistical language model 208. Thus, the run-time correction module applies a normalization factor to estimates from the statistical language model 208 when the observed counts from the domain training are consistent with an estimate from the general corpus statistical language model 208. In this case, the corrected probability estimate P'(z|xy)=P(z|xy) from the statistical language model 208 multiplied by some stored normalization factor for z|xy.

However, when the observed counts are not consistent and thus significantly differ, then the run-time correction module 206 discards the statistical language model's 208 returned probabilities, references the adjusted counts database 214 storing values smoothed counts C'(xy), and substitutes an associated probability of a smoothed count value C'(xyz) divided by smoothed count value C'(xy) from the adjusted counts database 214 for each matching special N-gram of xy and z in the special N-gram repository 212 as its corrected probability estimate P'(z|xy). Note, the smoothed counts mathematically readjusts the probability estimate associated with that special N-gram so the returned corrected probabilities are neither assigned a zero percent probability nor have numeric value which was divided by the number zero Given a context xy and word z provided by the decoder module 204, the run-time correction module 206 uses the databases listed above, and sometimes also the statistical language model 208, to calculate a corrected probability estimate P'(z|xy).

The statistical language correction module 222 (SCM) conducts the training phase for a specific linguistic domain of text analyzed. The statistical language correction module 222 (SCM) is configured to conduct a training phase aimed at identifying and recording those sequences of linguistic items xyz (N-grams) for which the probability estimate P(z|xy) is not a plausible estimate of the probability of z following xy in the current domain of linguistics, given the domain-corpus counts C(xyz) and C(xy) in the count database 220. In an embodiment, only N-grams xyz with associated positive counts C(xyz) greater than one in addition to being greater in difference than threshold value (t) are stored in the count database 220 as identified sequences of linguistic items xyz (N-grams) for which the probability estimate P(z|xy) is not a plausible estimate. Thus, the statistical language correction module 222 drives the training phase for a specific linguistic domain of text analyzed, in which contexts xy and possible words z for which the probability of a word z follows the given sequence words x followed by y P(z|xy) is a poor estimate are identified.

The statistical language correction module 222 couples to the general-corpus statistical language model 208. The statistical language correction module 222 uses the threshold value (t) to determine whether a difference in the observed counts in a domain specific count database 220 of sequences of linguistic items x, y and each of the possible linguistic items z are in fact significantly different from an estimated amount of counts of that same linguistic sequence xyz derived from the general use statistical language model 208.

The statistical language correction module 222 queries the general-corpus statistical language model 208 for estimates of the probabilities of any words z in the set of z' that generally follow and/or are sequentially grouped with the words x followed by y. The statistical language correction module 222 then compares these with the domain counts of occurrences that the sequence of the words C(xy) and C(xyz) appear in the specific linguistic domain of text analyzed from a counts database. The statistical language correction module 222 queries a discrepancy detection module 224 for whether the count ratio is significantly discrepant to the anticipated count ratio of the sequences of these words being found; if so, sends the special N-gram and its C(xyz) to a special N-gram repository 212 to be recorded as discrepant (special).

The discrepancy detection module (DDM) 224 couples to the statistical language correction module 222. The discrepancy detection module 224 is a filter to eliminate words that should not be stored as special N-grams in a special N-gram repository 212. The discrepancy detection module 224 determines both (1) whether the probability estimate P(z|xy) from the statistical language model 208 is a plausible probability estimate given the context count C(xy) and the N-gram count C(xyz), and also (2) whether it would be a plausible estimate if the counts were instead C(xy)−1 and C(xyz)−1, given a context count C(xy) and an N-gram count C(xyz) from the domain specific text stored in a count database 220 and a probability estimate P(z|xy) from the statistical language model 208.

The Discrepancy detection module 224 establishes a threshold value (t) to determine whether the difference in the observed counts in the domain specific count database C(xyz) is significantly different from an estimated amount of counts of the N-gram sequence of xyz in a general corpus background training data derived from the general corpus statistical language model 208 E(xyz).

The Discrepancy detection module 224 determines whether C(xyz) is within the range predictable from amount of counts of the sequence of words C(xy) and the probability of P(z|xy), where P(z|xy) estimates the probability of a given word z occurring immediately after the words xy. Note, P(z|xy) may be quite reliably be estimated by the proportion of times the words xy has been followed by z.

The special N-gram decremented database (SND) couples to the statistical language correction module 222. The special N-gram decremented database stores special N-grams with respect to decremented counts. The special N-gram decremented database stores special N-grams xyz and associated counts C(xyz) of the N-grams (xyz) for which the DDM 224 has determined that P(z|xy) from the statistical language model 208 is not a plausible estimate given the decremented counts C(xy)−1 and C(xyz)−1. When queried with a count r, the special N-gram decremented database also returns to the statistical language correction module 222 how many N-grams xyz in the database, which have that count, i.e. are such that C(xyz)=r.

Overview of an Example Embodiment

Figure 3:
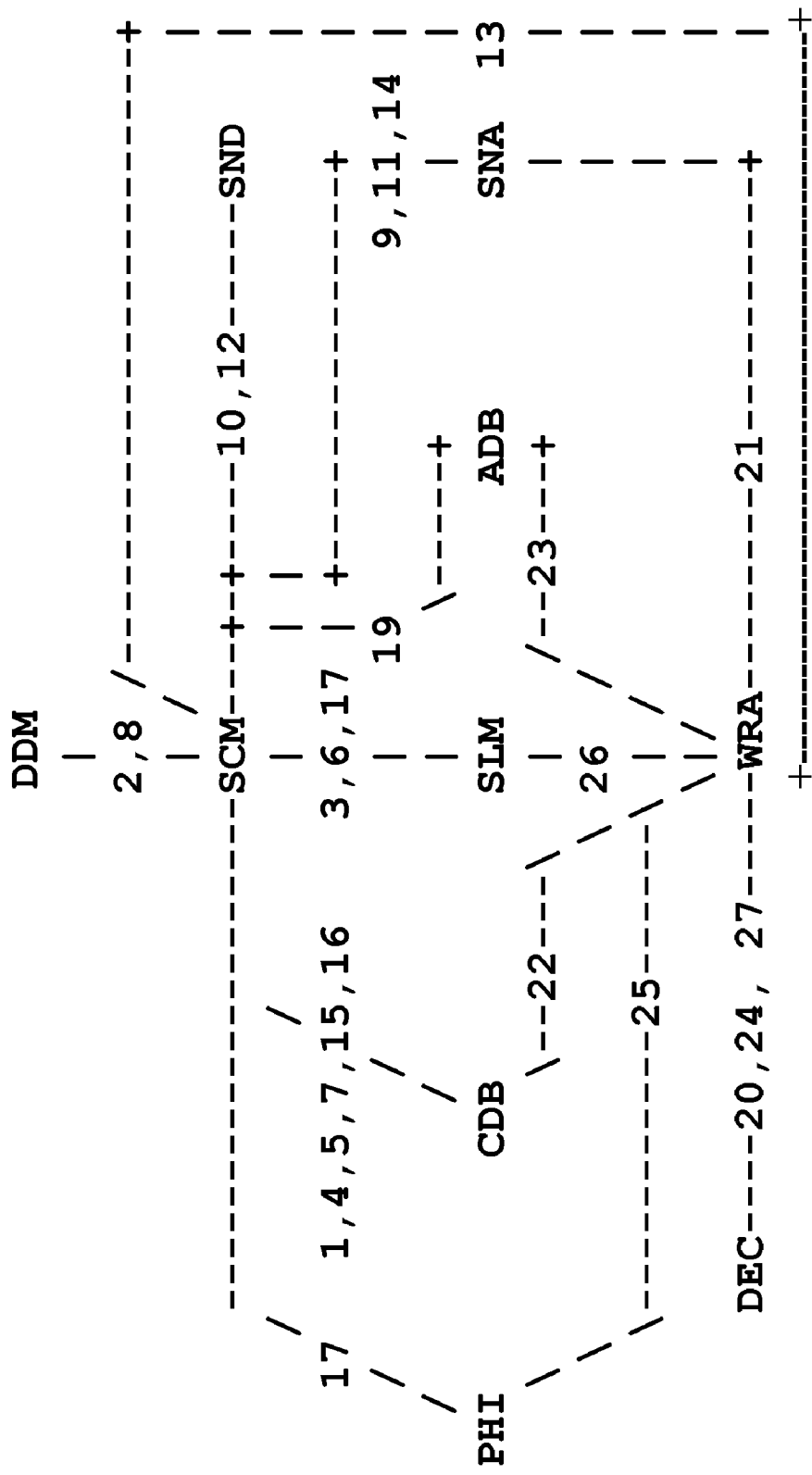
FIG. 3 illustrates a flow diagram of blocks showing a training phase and run time phase of generating a corrected probability estimate for a word in a context, either by applying a normalization factor to estimates from the underlying statistical language model when those estimates agree with the evidence available to the correction module, or directly from that evidence when they do not.

FIG. 3 illustrates a flow diagram of blocks showing a training phase and run time phase of generating a corrected probability estimate for special N-grams directly from the observed counts in that domain or applying a normalization factor to estimates from the statistical language model.

The training phase, driven by the statistical language correction module, is aimed at identifying and recording those sequences of linguistic items xyz(n-grams) for which the probability estimate P(z|xy) provided by the general statistical language model is not a plausible estimate of the probability of z following xy in the current domain, given the domain-corpus counts C(xyz) and C(xy) in the count database. For example, if, for a given xyz, C(xyz)=10 and C(xy)=100, then P(z|xy)=0.1 would certainly be a plausible estimate, but P(z|xy)=0.01 would be implausibly low and P(z|xy)=0.5 would be implausibly high. In general, the larger the value of C(xy), the smaller the range of plausible values of P(z|xy) given C(xyz).

As well as recording phrases for which P(z|xy) is implausible, the statistical language correction module estimates certain other quantities that will be used at run time to provide better corrected probability estimates P'(z|xy) and to ensure that those estimates are correctly normalized, i.e. that for every context xy, the sum of P'(z|xy) over every word z in the vocabulary is one.

In general, the vocabulary size V is expected to be large enough that it would take much too long to consider explicitly all of the $V^N$ possible phrases xyz (of length N) that can be constructed from the vocabulary. The training phrase therefore ensures that the only phrases xyz that are considered are, firstly, those with positive counts C(xyz) greater than one in the count database and, secondly, those for which the value P(z|xy) returned by the statistical language model is large enough that if C(xyz) were to be zero, P(z|xy) would be a poor estimate (as determined by the discrepancy detection module). The number of three word phrases in these two categories will in practice be much less than VN, rendering the training process acceptably efficient.

During the subsequent run-time speech recognition phrase, the wrapper run-time correction module calculates probability estimates P'(z|xy) that are approximately equal to the statistical language model's estimates P(z|xy) when P(z|xy) is plausible, and to C(xyz)/C(xy) when it is not. The actual estimates returned differ slightly from those approximations for two reasons: because estimates must be smoothed to avoid undesirable values of exactly 0 and 1, and to ensure estimates are normalized (sum to one) as explained above.

In detail, with numbered blocks as indicated below and in the diagram in FIG. 3 the training and run time phases are described.

The training procedure assumes the availability of an existing (general) SLM and counts of all word sequences of a specified length, typically but not necessarily three, from an additional (domain-specific) corpus.

Phase 1 is the initial training phase of the speech recognition system corresponding to 1-10 in the diagram. The general corpus statistical language model has been constructed and trained from background training data of text and phrases in general use, such as sources on the Web. The counts database is pre-populated with a smaller corpus of text trained to a specific domain. The other databases and repositories are empty (phi database, Special N-gram repository, special N-gram decremented database, adjusted-counts database).

For every context xy such that the count of $C(xy) \geq 2$, and for every potential word z in the vocabulary, the SLM is queried for its estimate of $P(z|xy)$. The number $C(xyz)$ of times that xyz actually occurs in the domain corpus is then compared to the count estimate $E(xyz)=C(xy)*P(z|xy)$ that should apply if $P(z|xy)$ is an accurate probability estimate.

If the observed counts in the domain specific count database $C(xyz)$ is significantly different from the estimated amount of counts found in the general use statistical language model $E(xyz)$, the N-gram xyz is added to a list of "special" N-grams, along with the values $C(xyz)$ and $E(xyz)$. The definition of "significantly different" might, for example, be that $C(xyz)$ falls outside the 95% two-tail confidence interval of a Poisson distribution with mean $E(xyz)$. However, any other definition is possible.

Furthermore, whether or not xyz is special in the above sense, the same comparison is carried out between $C(xyz)-1$ and the value of $E(xyz)*(C(xy)-1)/C(xy)$.

If a significant difference is found here, $C(xyz)$ is added to a separate list of special decremented counts.

Note that as specified here, phase 1 needs to be carried out for every xy sequence such that $C(xy) \geq 2$ in combination with every z in the vocabulary, not just those xyz with a positive count. If the SLM has a large vocabulary, such a procedure could be very time consuming.

To work around this, ideally, the SLM should be able to provide, for any context xy and threshold $t(xy)$ between 0 and 1, a "threshold set" of words z such that $P(z|xy) \geq t(xy)$. If $t(xy)$ is chosen to be the minimum value such that a count $C(xyz)=0$ is significantly different from $C(xy) t(xy)$, then the set of words z that need to be checked is the union of those for which xyz has a positive count and the threshold set. This union will for most contexts be much smaller than the whole vocabulary.

If the SLM does not have such a facility, an approximation is acceptable; for example, the SCM could take the threshold set as those words z for which $P(z)$ (not conditioned on xy) is at least $t(xy)$. This can be found efficiently because the system can order the vocabulary by decreasing values of $P(z)$ once at the beginning of the process, and then for each xy we consider, generate the threshold set when required by reading down it for as long as $P(z) \geq t(xy)$. An approximation like this only means that some special N-grams will be missed, which may slightly reduce the accuracy of the overall procedure but will not render it invalid.

The phase 1 training consists of the following example blocks 1-10 to identify special n-grams in this domain.

In block 1, the statistical language correction module queries the count database requesting all sequences of x followed by y and their counts for which the counts $C(xy)$ is greater than one ($>1$). The statistical language correction module asks the count database for all contexts xy and their (domain-corpus) counts $C(xy)$ in the count database for which $C(xy)$ is greater than one. The count database returns all such contexts and their counts.

For each such context xy in turn, blocks 2 to 10 are executed for merely counts of phrases (XY) and (xyz) that occur two or greater times. The statistical language correction module is trying to figure out the probabilities for every possible combination of uttered words that linguistically, on statistical basis, could be the guessed at word Z, that can logically follow the identified sequences of words xy, where $C(xy)$ is greater than one. From this superset of counts $C(xy)$, the statistical language correction module then wants to identify all "special" phrases xyz—those for which $P(z|xy)$ from the statistical language model is implausible given actual counts of $C(xyz)$ and $C(xy)$—that have been identified and recorded in the domain specific count database.

In block 2, the statistical language correction module provides the discrepancy detection module with $C(xy)$ and asks it for the threshold value t for which, if $C(xyz)=0$ for some z, it would judge any statistical language model estimate $P(z|xy)$ to be implausible if and only if $P(z|xy)$ were to be greater than or equal to t. The discrepancy detection module returns such a threshold value t to the statistical language correction module. The threshold value t can be determined by classical hypothetical testing including using a 95% Poisson Distribution model, etc. Thus, the statistical language correction module provides the discrepancy detection module with $C(xy)$ and requests the minimum $t(xy)$ such that 0 is significantly different from $C(xy) t(xy)$.

If the statistical language model can do thresholding then block 3 is performed.

In block 3, the statistical language correction module asks the statistical language model for a list $Z0(xy)$ of all z values for which $P(z|xy)$ is at least threshold value t, if the statistical language model is able to construct such a list. Thus, the statistical language correction module queries the statistical language model for all z such that $P(z|xy) > t(xy)$. The statistical language model then returns all such z, called set $Z0(xy)$, to the statistical language correction module.

If the statistical language model is not able to do this thresholding, then instead block 4 is performed.

In block 4, the statistical language correction module estimates the list $Z0(xy)$ itself, perhaps by asking the count database for all z values such that $C(z)/C(.)$ is at least t. Thus the SCM approximates $P(z|xy)$ by $P(z)=C(z)/C(.)$, as follows. First, the statistical language correction module request from the count database all z such that $C(z) \geq t(xy) C(.)$. Next, the count database returns all such z in a set called $Z0(xy)$. In general, $Z0(xy)$ constructed in this way will not be equal to the true value: that is, it will contain some z such that $P(z|xy)$ is less than t, and will omit some z for which $P(z|xy)$ is greater than t. Such inaccuracies will, in the first case, increase the time required for training, and in the second case, result in some loss of accuracy in the corrected probability estimates to be handed to the decoder during speech recognition. However, these effects are not expected to be very serious in either case.

In block 5, the statistical language correction module asks the count database for a list $Z1(xy)$ of all words z such that $C(xyz)$ is greater than zero. The count database returns this list. Thus, the statistical language correction module queries the count database to request all words z in which the count of $C(xyz)>0$. The count database then returns to the statistical language correction module a list of all such z and $C(xyz)$ and calls this set $Z1(xy)$.

For every word z that occurs in $Z0(xy)$, in $Z1(xy)$ or in both, block s 6 to 10 are executed. Thus, for every word z in the union $(Z0(xy),Z1(xy))$ blocks 6 to 10 are also executed to compare the statistical language model to the domain specific counts database.

In block 6, the statistical language correction module asks the statistical language model for its estimate of $P(z|xy)$, and the statistical language model returns this $P(z|xy)$ value.

In block 7, the statistical language correction module asks the count database for value of $C(xyz)$ and $C(xy)$, which the count database returns. Thus, the SCM queries CDB counts associated with sequence xy in the domain specific counts database and counts associated with sequence xyz in the domain specific counts database.

In block 8, the statistical language correction module provides the discrepancy detection module with the values $C(xyz)$, $C(xy)$ and $P(z|xy)$. The discrepancy detection module determines whether the domain counts of occurrences that the sequence of the words $C(xy)$ and $C(xyz)$ is discrepant to the anticipated counts of those occurrences derived from the SLM based on the counts recorded in background training data in the SLM. The discrepancy detection module returns two judgments: firstly, whether $P(z|xy)$ from the SLM is a plausible estimate of the probability of z following xy given the counts $C(xyz)$ and $C(xy)$; and secondly, whether it would be a plausible estimate if there had been one fewer occurrences of xyz, i.e. if the counts had been $C(xyz)-1$ and $C(xy)-1$.

In block 9, if the discrepancy detection module's first judgment of observed counts of xyz in the domain to estimated counts of xyz in general use, in step 8, was that of implausibility, the statistical language correction module sends the phrase xyz, and its count $C(xyz)$, to the special N-gram repository. The special N-gram repository stores xyz and adds one to its count of the number of times it has so far been given the count value $C(xyz)$. Thus, the discrepancy detection module returns to the statistical language correction module whether $C(xyz)$ is significantly different from $C(xy) P(z|xy)$. If the counts are significantly different only then store this instance of the xyz as a special N-gram in the special N-gram repository.

In block 10, if the discrepancy detection module's second judgment of decremented observed counts of xyz in the domain in step 8 was that of implausibility, the statistical language correction module sends the count $C(xyz)$ to the special N-gram decremented database. The special N-gram decremented database adds one to its count of the number of times it has so far been given the count value $C(xyz)$. Thus, the discrepancy detection module also returns to the statistical language correction module (2) whether $C(xyz)-1$ is significantly different from $(C(xy)-1)P(z|xy)$. The special N-gram decremented database stores xyz if discrepancy detection module decides(2 for above) was yes.

Phase 2 training corresponds to blocks 11-13 in FIG. 3 to generate smoothed count values. A "frequency of frequencies" table F is calculated for the set of special counts $C(xyz)$. Table entry $F(r)$ is the number of distinct special N-grams xyz such that $C(xyz)$ is exactly r.

An analogous frequency of frequencies table G is calculated for the special decremented counts: $G(r)$ is the number of distinct N-grams xyz for which $C(xyz)=r$ and a significant difference was found for $C(xyz)-1$.

Overall, a smoothed value $S(r)$ must then be defined to be used in place of every special count r, otherwise unobserved events will be assigned zero probabilities. One way to do this is to use the following variant of the Good-Turing smoothing formula. If r is greater than or equal to some constant k, we set $S(r)=r$; otherwise, we set $S(r)=(r+1)G(r+1)/F(r)$. k is chosen to be large enough for small values of r to be effectively smoothed, but not so large that inaccuracies will result from low values of $G(r+1)$ or $F(r)$. For example, we might set k to be the lowest positive integer such that $(k+1)G(k+1)/F(k)$ is not between k−1 and k.

Once the function $S( )$ is defined, we define $C'(xyz)$, the smoothed count of xyz, to be equal to $S(C(xyz))$.

The phase 2 training consists of the following example steps 11-13.

In block 11, by this point, all "special" phrases xyz—those for which $P(z|xy)$ from the SLM is implausible given $C(xyz)$ and $C(xy)$—have been identified and recorded in the domain specific counts database. The statistical language correction module asks the special N-gram repository for its count-of-counts table: how many times it was given each count value. We will use the notation $F(r)$ for the count of count r in this table. Thus, the statistical language correction module queries the special N-gram repository for its freq-of-freqs table $F(r)$ for all r.

In block 12, similarly, the statistical language correction module asks the special N-gram decremented database for its count-of-counts table, for which we will use the notation $G(r)$ for the count of count r.

In block 13, the statistical language correction module will define a smoothed count $S(r)=$e.g. $(r+1)G(r+1)/F(r)$. Shorthand: $C'(xyz)=S(C(xyz))$ The SCM figures out the actual number of counts of the sequence of xyz that did occur in the corpus of the text in the domain being analyzed to the anticipated amount of counts from the background training data in the SLM to smooth out a readjustment for the probability estimate associated with that special N-gram stored in the special N-gram repository. The SCM does not allow the ratio to be divided by the number 0 or the number 0 to be divided by some other number; rather, a number near zero but not zero is used to readjust the probability.

Accordingly, on the basis of $F(r)$ and $G(r)$, the statistical language correction module now uses the following variant of Good-Turing smoothing. Let k be the smallest positive integer such that $(k+1)G(k+1)/F(k)$ is not between k−1 and k. Then for all integer counts r greater than or equal to k, we define $S(r)=r$. For all non-negative integer counts r less than k, we define $S(r)=(r+1)G(r+1)/F(r)$. We now define the smoothed count estimate of xyz to be $C'(xyz)=S(C(xyz))$. The theory behind Good-Turing smoothing suggests that $C'(xyz)$ is likely to be a better prediction than $C(xyz)$ of the number of times xyz would be observed if another domain corpus of the same size were to be collected under exactly the same conditions. In particular, if $C(xyz)$ is zero, $C'(xyz)$ will be positive, while if $C(xyz)$ is small but positive, $C'(xyz)$ will tend to be less than $C(xyz)$. $C'(xyz)$ is therefore more appropriate than $C(xyz)$ for use in constructing corrected probability estimates during speech recognition. The statistical language correction module sends the value of k, and of $S(r)$ for non-negative integer values of r less than k, to run-time correction module, to allow it to smooth count values at run time. Smooth counts (positive numbers including fractions) less than the k count threshold will not equal raw counts (note raw counts can only be positive integers). The SCM needs to smooth counts of XY smaller than the k count to ensure a zero probability will not be returned to the decoder module. Generally, smaller counts are estimated down but zero counts is made some fractional positive value above zero.

Phase 3 training corresponds to block 14-19 in FIG. 3 and below. For every context xy such that xyz was deemed special in phase (1) for at least one z, we calculate a context factor Phi(xy) as follows:

$$C'(xy) = C(xy) + \text{sum}\{z: xyz \text{ is special}\}(C'(xyz) - C(xyz)) \quad (1)$$

$$A(xy) = \frac{\text{sum}\{z: xyz \text{ is special}\}C'(xyz)}{C'(xy)} \quad (2)$$

$$B(xy) = \text{sum}\{z: xyz \text{ is special}\}P(z|xy) \quad (3)$$

$$Phi(xy) = \frac{1-A(xy)}{1-B(xy)} \quad (4)$$

For contexts xy for which no xyz is special, we define Phi(xy)=1.

Blocks 14 to 19 populate the adjusted context-count database and the normalization factor PHI database.

In block 14, the statistical language correction module asks the special N-gram repository for each context/sequence of xy for which it is holding any phrase xyz, and for each such xy, all the z values in question; we will call this set of z values Z(xy). The statistical language correction module needs to normalize because the wrapper identified that certain words of speech are more frequently used in this domain than in general use. Thus, normalize the probabilities coming from the statistical language model in light of the context of this domain. Generally, the statistical language correction module queries the special N-gram repository, requesting all xy in the special N-gram repository such that xyz is present for at least one z, and all the z's in question. The special N-gram repository returns to the statistical language correction module all z for which xyz is in the special N-gram repository.

Blocks 15 to 19 are then carried out for each such xy. They calculate the following quantities:

C'(xy) from adjusted counts database is C(xy) plus, for every z in Z(xy), the difference between C'(xyz) and C(xyz). Thus C'(xy) is a version of C(xy) adjusted to allow for the smoothing carried out on counts of special phrases. C'(xy) will be stored in the adjusted counts database. C'(xy)=C(xy)+ sum {z: xyz is special} (C'(xyz)−C(xyz)).

A(xy) is the sum of C'(xyz) for every z in Z(xy), divided by C'(xy). In other words, it is the wrapper's estimate (see step 23 below) of the probability that xy will be followed by some word (any word) in Z(xy).

$$A(xy) = \frac{\text{sum}\{z: xyz \text{ is special}\}C'(xyz)}{C'(xy)}$$

B(xy) is the sum of P(z|xy) (the statistical language model's estimates) of every z in Z(xy). In other words, it is the statistical language model's estimate of the probability that xy will be followed by some word (any word) in Z(xy). A(xy) and B(xy) are required solely to calculate Phi(xy) next step. B(xy)=sum {z: xyz is special} P(z|xy).

Phi(xy) is one minus A(xy), divided by one minus B(xy). That is, Phi(xy) is the ratio of the wrapper's estimate of the probability that xy will be followed by a word not in Z(xy) and the statistical language model's estimate of the same quantity. Phi(xy) will be stored in the PHI database of normalization database; during speech recognition (step 27), run-time correction module multiplies the probability estimates P(z|xy) arising from the statistical language model (for words not in Z(xy)) by Phi(xy). This scaling operation ensures that for any xy, the sum over all z of P'(z|xy) returned by run-time correction module to speech recognition decoder module equals A(xy) (for those z in Z(xy)) plus Phi(xy) times (1−B(xy)), which equals A(xy) plus 1−A(xy), which equals one, as desired for correct normalization.

In block 15, the statistical language correction module asks the count database for C(xy), which the count database returns. The statistical language correction module initializes C'(xy) to C(xy), and both A(xy) and B(xy) to zero.

In block 16, for each z returned by the special N-gram repository with xy [for each z in Z(xy)], the statistical language correction module asks the count database for C(xyz), the count database queries returns C(xyz) to the statistical language correction module, and the statistical language correction module then smoothes the result to obtain C'(xyz). The statistical language correction module then adds the difference C'(xyz)-C(xyz) to C'(xy), and the value C'(xyz) to A(xy).

In block 17, for each z in Z(xy), the statistical language correction module asks the statistical language model for P(z|xy) and the statistical language model returns P(z|xy), and the statistical language correction module adds the result to B(xy).

In block 18, the statistical language correction module divides A(xy) by C'(xy), calculates Phi(xy)=(1−A(xy))/(1−B(xy)) [Phi(xy)=(1−A(xy))/(1−B(xy))], and sends xy and Phi(xy) to the PHI database of normalization database for storage. Thus, the statistical language correction module sends xy and Phi(xy) to the PHI database of normalization database for storage.

In block 19, the statistical language correction module sends xy and C'(xy) to the adjusted counts database for storage.

Blocks 1-19 complete the training process.

During run-time speech recognition, where the observed counts from the domain training are consistent with the estimate from the general corpus SLM, the design modifies that estimate only slightly; but where the observed counts are not consistent, the design generates a new estimate directly from the observed counts in that domain and ignores the general corpus SLM's predictions.

During speech recognition, the quantities calculated during training are used as follows.

The run time correction module returns an adjusted probability estimate P'(z|xy) to the decoder as follows:

If xyz is a special n-gram in the SNA, P'(z|xy)=C'(xyz)/C'(xy)

Otherwise, P'(z|xy)=Phi(xy)*P(z|xy)

Thus for special xyz n-gram listed in the SNA, the run time correction module uses only the smoothed counts from the domain model for the corrected probability estimate returned to the decoder, while for other sequences of xyz, the run time correction module uses the estimate from the existing SLM, adjusted where necessary by Phi(xy) to ensure that the sum of corrected probability estimates P'(z|xy) for all of the potential z's returned comes to one.

Run time

In block 20, the speech recognition decoder module of the speech recognition application sends to the run-time correction module: the sequence of words xy that is identified as being correct, and asks what is the probability of each linguistically possible word z for each of the individual block combinations of xy and z'. The speech recognition decoder module requests the corrected P'(z|xy) ('corrected' probability estimate). Thus, the speech recognition decoder module sends a context xy and a word z to run-time correction module, and asks it for a probability estimate P'(z|xy). speech recognition decoder module asks given the identified sequence of words x followed by y, what is the linguistic probability for each instance of z that could follow xy. The wrapper first determines whether xyz is a special N-gram listed in the special N-gram repository or not. If XYZ is a special N-gram then performs steps 22-24 to discard the statistical language model's returned probabilities and substitute the special N-gram with the associated probability of smoothed C'(xyz) divided by smoothed C'(xy) from adjusted counts database as its estimate P'(z|xy).

In block 21, the run-time correction module queries the special N-gram repository is xyz special? The special N-gram repository replies yes or no to the run-time correction module. Thus, the run-time correction module asks special N-gram repository whether it contains the phrase xyz. If it does (that is, if it was decided during training that the statistical language model's estimate of P(z|xy) was unacceptable), steps 22-24 are executed; otherwise (if the statistical language model's P(z|xy) was deemed acceptable), steps 25-27 are executed.

In block 22, the run-time correction module sends xyz to count database and asks for the value of C(xyz), which the run-time correction module smoothes using k and the function S(r)) to C'(xyz).

In block 23, the run-time correction module sends xy to adjusted counts database and asks for the value of C'(xy) from adjusted counts database. The ADB returns C'(xy) to smooth probability associated with returned sequence(s) of xyz to the run-time correction module so none are mathematically divided by zero or have zero divided by some number.

In block 24, the run-time correction module returns smoothed C'(xyz) divided by smoothed C'(xy) from adjusted counts database as its domain corrected estimate P'(z|xy) to the decoder. Thus, the run-time correction module returns P'(z|xy)=C'(xyz)/C'(xy) to the speech recognition decoder module of the speech recognition application Steps taken by the correction module when the (xyz) query from the decoder is not listed as a special N-gram in the special N-gram repository are next. The wrapper receives the probability estimate of z linguistically following xy from the statistical language model, normalizes that probability estimate based on the Phi database so the sum for the set of all returned possibilities for z is equal to 100 percent, and then sends back the normalized probability estimate back to the statistical language model.

In block 25, the run-time correction module sends xy to the PHI database of normalization, which returns the value Phi (xy). Thus, the PHI database of normalization PHI returns Phi(xy) to the run-time correction module. Note (the value is 1 if xy is not in Phi).

In block 26, the run-time correction module sends xy and z to statistical language model, which returns its estimate P(z|xy). Thus, the statistical language model return P(z|xy) to the run-time correction module.

In block 27, the run-time correction module normalizes P(z|xy) by multiplying it by Phi(xy), and returns the result as P'(z|xy). Thus, the run-time correction module queries returns P'(z|xy)=P(z|xy) Phi(xy) to the speech recognition decoder module of the speech recognition application.

Figure 4:
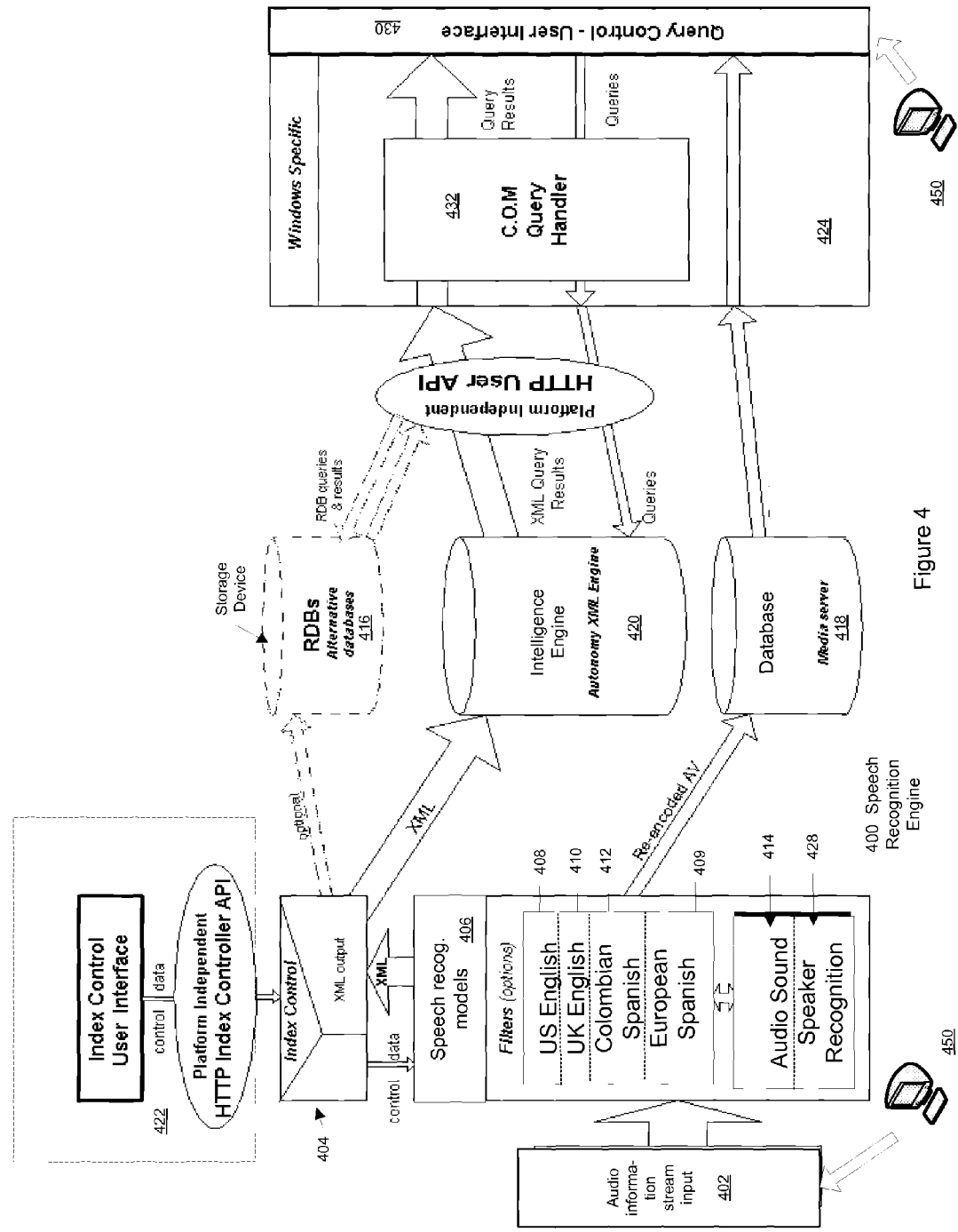
FIG. 4 illustrates an embodiment of a continuous speech recognition engine that improves the accuracy of probability estimates, from an underlying statistical model, of how likely specified linguistic units to occur immediately after specified sequence of other such units, by adding a correction module trained on additional information that systematically corrects the underlying model's estimates, where estimates significantly disagree with the evidence available to the correction module.

FIG. 4 illustrates an embodiment of a continuous speech recognition engine that improves an accuracy of probability estimates of how linguistically likely a sequence of linguistic items are to occur in that sequence from an existing general-corpus statistical language model by adding a correction module trained to a specific domain that systematically corrects the statistical language model estimates, where those probability estimates from the statistical language model significantly disagree with the linguistic probabilities in that domain. In an embodiment, the continuous speech recognition engine 400 may include one or more inputs 402 for information streams, an index control module 404, a continuous speech recognition engine including a correction module and a decoder module 406, one or more attribute filters 408, 409, 410, 412, 414 in the decoder module 406, storage devices such as a rational data base 416 and an audio-visual media server 418, an intelligence engine 420, a triggering and synchronization module 422 including an index control user interface, and a manipulation module 424 including a query control user interface 430.

The continuous speech recognition engine 400 can be used by a user from a client machine 450 supplying audio files, including audio visual files, from the client machine 450 over a wide area network, such as the Internet, to a server hosting the continuous speech recognition engine 400 with the robustness measure system.

Overall, in an embodiment, one or more streams of audio information pass through the continuous speech recognition module 406 discussed above in FIGS. 1-3 and incorporates similar component parts. The recognition modules 406 couples to the index control module 404. The index control 404 sends data corresponding to attributes of the information stream passing through the continuous speech module 406 indexes all of the data from the continuous speech recognition module 406. The index control module 404 then may send the indexed data to a storage device 416 as well as the intelligence engine 420. The manipulation module 424 contains a graphic user interface 430 to allow a user to manipulate the indexed data. The triggering and synchronization module 422 allows the user to program events to occur automatically based upon the indexed data passing through the index control module 404.

In an embodiment, the continuous speech recognition engine 400 may have one or more information stream inputs 402 into the continuous speech recognition module 406. In an embodiment, at least one of the information stream inputs 402 includes audio-visual data.

The continuous speech recognition module 406 with the corrected probability estimates translate the supplied audio and create a time coded text file, where each transcribed word has the robust confidence level parameter as a measure of how confident the system is that the word was correctly identified. Each word in the supplied audio file is stored in a memory with a robust confidence level parameter and the start and stop time codes from the common time line.

Accordingly, the user interface 430 may supply a transcript of recognized words in which those recognized words below a threshold robust confidence level are indicated in the transcript. The intelligence engine 420 may assign a higher weight to recognized words with a robust confidence level above a threshold than recognized words below the threshold, and use the weight for the recognized words when queries are made with the user interface 430. The user interface 430 is configured to allow a speech data analytics on each word in the supplied audio file 402 stored in the memory based on the robust confidence level parameter.

For example, a user from a client machine 450 may then supply to the user interface 430 query words of interest to find out if the supplied audio file 402 contains any of the query words. The intelligence engine 430 identifies recognized words below a certain robust confidence level to be filtered out from the query or just placed in a hierarchical rank list at the bottom of the ranked list due to the weighting associated with the recognized words below a certain robust confidence level. The user may then activate/click a link to the returned time segments containing those recognized words matching the query words and listen to a segment of the audio file pertinent to when those words are spoken in the supplied audio file 402.

Similarly, the continuous speech recognition engine 400, that may be resident on the server, can also monitor call center audio conversations and identify when certain words of interest are spoken with the triggering and synchronization module 422. The triggering and synchronization module 422 then directs a user on the client machine 450 to the time segment containing those words matching the trigger words and allow the user to listen to a segment of the audio file pertinent to when those trigger words are spoken in the supplied audio file. The triggering and synchronization module 422 may send an event notification to the client machine 450 over the network so the user on the client machine 450 can activate/click on the notification to allow the user to listen to the segment of the audio file pertinent to when those trigger words are spoken in the supplied audio file 402.

The continuous speech recognition module 406 cooperates with various human language models 408, 410, 412, 414 which the correction module adapts to those domains. For example, an embodiment may contain attribute filters including a various human language models including United States English 408, United Kingdom English 410, European Spanish 409, Colombian Spanish 412, and an audio sound attribute filter 414. In an embodiment, the one or more attribute filters 408, 409, 410, 412, 414 may identify attributes from each stream of information. The identified attributes may be a human language type, a change in human language type being spoken, a human accent, a change in human accent being spoken, speaker's individual voice characteristic, a change of speaker, discrete spoken words, individual written words, and other similar characteristics.

For each recognized word, the attribute filter generates an individual XML document including as elements the identified word, the confidence rating from each language model, and the time code for that word. The transcript of the entire supplied audio file corresponds with an overall XML document for that conversation. However, because each word is a discrete XML document itself within the aggregate XML document, then a user may select a phrase or portion within the transcript and start playing the audio segment from that exact moment in time corresponding to the selected phrase.

The manipulation-module 424 interacts with the storage devices 416 and the intelligence engine 420 to allow a user to navigate and utilize an indexed stream of recognized words. Due to the recognized words begin organized through a time ordered index, transmodal manipulations of each type of attribute may occur. A user from a client machine 450 through the user interface 430 may perform operations on a first set of attributes in order to manipulate a second set of attributes.

For example, a user may create a new audio clip of a desired segment of a radio broadcast by highlighting the transcript text and cutting the transcript text from the text document. Further, the user may splice multiple video clips together by assembling and inserting text corresponding to each video clip. Thus, the user manipulates a first type of attribute such as the transcripted text in order to perform an operation on the second type of attribute such as spoken words or video characteristics.

In natural language and Boolean language queries, the intelligence engine 420 queries a natural language and/or Boolean language query from the manipulation-module 424 against any part of the XML documents stored in the storage, within the intelligence engine 420, and/or storage devices 416 external to the system such as the Internet. The intelligence engine 420 also can be queried to provide suggestions of similar content. Thus, for example, a user may remember three key words about a video segment of information that the user is trying to locate. The user may submit the query through the query control user interface 430 and view the resulting video segments that match the query results on in the display window 444.

In concept matching, the intelligence engine 420 accepts a piece of content or reference (identifier) as an input and returns references to conceptually related items ranked by relevance, or contextual distance. This may be used to generate automatic hyperlinks between pieces of content. Thus, while a live feed is being broadcast, the triggering and synchronization module may display hyperlinks to related documents to the topic which the speaker is talking about based upon concept matching to the indexed transcript correlating to the video segment.

In agent creation, the intelligence engine 420 accepts a piece of content and returns an encoded representation of the concepts, including each concept's specific underlying patterns of terms and associated probabilistic ratings. In agent retraining, the intelligence engine 420 accepts an agent and a piece of content and adapts the agent using the content. In agent matching, the intelligence engine 420 accepts an agent and returns similar agents ranked by conceptual similarity. This may be used to discover users with similar interests, or find experts in a field. This may also be used to identify a particular speaker even though continuous speech recognition engine 400 has no previous knowledge of that speaker.

The robust confidence level assigned to each recognized word outputted from the continuous speech recognition engine 400 may be used in all sort of speech to text applications. Words below a certain robust confidence level may be filtered out from the query or just place in a hierarchical rank list at the bottom, and identified words with a high robust confidence level would be at the top of the hierarchical rank list of matching words to the query. This hierarchical ranked list based on robust confidence level in effect creates a prefilter for the user making the query by ranking the more likely less relevant corresponding matches at the bottom of the list and the more likely relevant matches with the higher weighed values at the top of this list reported back to the user. The continuous speech recognition engine 400 allows the user to prioritize and moderate the search results based on robustness. The continuous speech recognition engine 400 allows different weightings to be applied to words based on robustness ratings during speech data analytics. The robustness rating may be used as a measure of how usable/reliable each word produced is.

The computing system environment 400 where a server hosts the continuous speech recognition engine is only one example of a suitable computing environment and is not intended to suggest any limitation as to the scope of use or functionality of the invention. The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The continuous speech engine may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium. Therefore, the component parts, such as the decoder module 106, etc. may be fabricated exclusively of hardware logic, hardware logic interacting with software, or solely software.

A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. The invention is to be understood as not limited by the specific embodiments described herein, but only by scope of the appended claims.

What is claimed is:

1. A speech recognition apparatus, comprising:
a general-corpus statistical language model that provides probability estimates of how linguistically likely a sequence of linguistic items are to occur in that sequence based on an amount of times the sequence of linguistic items occurs in text and phrases in general use;
a speech recognition decoder module that requests a run-time correction module for one or more corrected probability estimates P'(z|xy) of how likely a linguistic item z is to follow a given sequence of linguistic items x followed by y; where x, y, and z are three variable linguistic items supplied from the decoder module, and the decoder module has an input to receive back the one or more domain correct probability estimates from the run-time correction module for one or more possible linguistic items z that follow the given sequence of linguistic items x followed by y;
a first input in the run-time correction module configured to receive requests from the decoder module to return the one or more domain correct probability estimates for the one or more possible linguistic items z that could follow the given sequence of linguistic items x followed by y, wherein the run-time correction module is trained to linguistics of a specific domain, and is located in between the speech recognition decoder module and the statistical language model in order to adapt the probability estimates supplied by the general-corpus statistical language model to the specific domain when those probability estimates from the general-corpus statistical language model disagree by at least an established criterion based on a statistical test with the linguistic probabilities in that domain;
a second input in the run-time correction module configured to receive from the statistical language model one or more probability estimates P(z|xy) of how likely are each of the possible linguistic items z that could follow the given sequence of linguistic items x followed by y;
an output in the run-time correction module to return to the decoder module one or more domain corrected probability estimates P'(z|xy) of how likely are each of the possible linguistic items z that could follow the given sequence of linguistic items x followed by y; and
an output module of the speech recognition system configured to provide a representation of what uttered sounds and words were inputted into the speech recognition system based on the domain corrected probability estimates, wherein the modules and models making up the speech recognition apparatus are implemented in electronic circuits, software coding, and any combination of the two, where portions implemented in software coding are stored in a format that is executable by a processor.

2. The apparatus of claim 1, further comprising:
a statistical language correction module coupled to the general-corpus statistical language model, where the statistical language correction module uses the established criterion based on the statistical test to determine whether a difference in the observed counts in a domain specific count database of sequences of linguistic items x, y and each of the possible linguistic items z are in fact significantly different from an estimated amount of counts of that same linguistic sequence xyz derived from the general-corpus statistical language model, wherein the units of the linguistic items xyz are words, word phrases, or a combination of both.

3. The apparatus of claim 1, further comprising:
a special N-gram repository coupled to the run-time correction module, where the special N-gram repository acts as a repository to store all special N-grams, sequences of linguistic items xyz, that have significantly different counts/occurrences in the corpus of domain specific text analyzed than would be expected compared to a background training data from the general-corpus statistical language model indicative of text phrases in general use, where the special N-grams (xyz) are three or more linguistic items in that sequence and are stored along with the actual counts of the number of times that N-gram appeared in the corpus of domain specific text analyzed, and the special N-gram repository when queried with a linguistic sequence of xyz returns whether the N-gram xyz is included in the repository database and the observed counts associated with that special N-gram (xyz).

4. The apparatus of claim 1, further comprising:
a count database coupled to the run-time correction module, where the count database is a pre-populated database specific to a linguistic domain that contains at least the number of counts that the sequence of linguistic items x followed by y occurs in overall corpus of domain-specific text from this domain analyzed C(xy), as well as the number of counts C(xyz) the N-grams (xyz), sequences of linguistic items of x followed by y followed by z, occurs in the overall corpus of domain-specific text from this analyzed domain, and where the count database returns the linguistic sequences of xy, the N-gram (xyz), and the observed counts of both C(xy) and C(xyz) in the corpus of domain-specific text analyzed when requested by the run-time correction module, but is not itself modified either during a training time or at run time.

5. The apparatus of claim 1, further comprising:
a Phi database of normalization values (Phi) coupled to the run-time correction module, where the Phi database of normalization values stores normalization values Phi (xy) for contexts of given linguistic items x followed by y for each possible z, wherein the Phi database applies a mathematical factor to correct the count data in raw form from a domain specific count database to have normalized probabilities so the sum for the set of all returned possibilities for z is equal to 100 percent.

6. The apparatus of claim 1, wherein the run-time correction module receives an input from the statistical language module, a Phi database of normalization values, a domain specific counts database, a special N-gram repository of sequences of linguistic items, and the speech recognition decoder module, and
the speech recognition decoder module sends to the first input of the run-time correction module the given sequence of linguistic items xy that is assumed to be correct, and asks what is the probability of each linguistically possible word z for each of the individual block combinations of xy and z, where the run-time correction module first determines whether each possibility of the linguistic sequence xy and z is a special N-gram listed in the special N-gram repository or not, and when the sequence of linguistic items xyz is a special N-gram, then the correction module generates a corrected probability estimate directly from the observed counts in that domain and discards the predictions from the general-corpus statistical language module for that xyz possibility.

7. The apparatus of claim 6, wherein the run-time correction module applies a normalization factor to estimates from the statistical language model when the observed counts from the domain training are consistent with an estimate from the general corpus statistical language model; but when the observed counts are not consistent and thus significantly differ, then the run-time correction module discards the statistical language model's returned probabilities and substitutes an associated probability of smoothed count value C'(xyz) divided by smoothed count value C'(xy) from an adjusted counts database for each matching special N-gram of xy and z in the special N-gram repository as its corrected probability estimate P'(z|xy), where the smoothed counts mathematically readjust the probability estimate associated with that special N-gram so the returned corrected probabilities are neither assigned a zero percent probability nor have numeric value which was divided by the number zero.

8. The apparatus of claim 1, further comprising:
a statistical language correction module coupled to the general-corpus statistical language model, where the statistical language correction module conducts a training phase for a specific linguistic domain of text analyzed, in which contexts xy and possible words z for which the probability of a word z follows the given sequence words x followed by y P(z|xy) is a poor estimate are identified, where the statistical language correction module queries the general-corpus statistical language model for estimates of the probabilities of any words z in the set of z that generally follow and/or are sequentially grouped with the words x followed by y, where the statistical language correction module then compares these with the domain counts of occurrences that the sequence of the words C(xy) and C(xyz) appear in the specific linguistic domain of text analyzed from a counts database, where the statistical language correction module queries a discrepancy detection module for whether the count ratio is significantly discrepant to the anticipated count ratio of the sequences of these words being found; if so, sends the special N-gram and its C(xyz) to a special N-gram repository to be recorded.

9. The apparatus of claim 1, further comprising:
a statistical language correction module coupled to the general-corpus statistical language model, where the statistical language correction module is configured to conduct a training phase aimed at identifying and recording those sequences of linguistic items xyz (N-grams) for which the probability estimate P(z|xy) is not a plausible estimate of the probability of z following xy in the current domain of linguistics, given the domain-corpus counts C(xyz) and C(xy) in the count database, and where only N-grams xyz with associated positive counts C(xyz) greater than one are stored in the count database as identified sequences of linguistic items xyz for which the probability estimate P(z|xy) is not a plausible estimate.

10. The apparatus of claim 1, further comprising:
a special N-gram decremented database coupled to the statistical language correction module, where the special N-gram decremented database stores special N-grams xyz and associated counts C(xyz) of the N-grams (xyz) that have been determined that P(z|xy) from the statistical language model is not a plausible estimate given the decremented counts C(xy)−1 and C(xyz)−1, and when queried with a first count amount, the special N-gram decremented database also returns to the statistical language correction module how many N-grams xyz in the database, which have that first count amount.

11. The apparatus of claim 9, further comprising:
a discrepancy detection module coupled to the statistical language correction module, where the discrepancy detection module is a filter to eliminate words that should not be stored as special N-grams in a special N-gram repository, where the discrepancy detection module determines both (1) whether the probability estimate P(z|xy) from the statistical language model is a plausible probability estimate given the context count C(xy) and the N-gram count C(xyz), and also (2) whether it would be a plausible estimate if the counts were instead C(xy)−1 and C(xyz)−1, given a context count C(xy) and an N-gram count C(xyz) from the domain specific text stored in a count database and a probability estimate P(z|xy) from the statistical language model.

12. The apparatus of claim 1, further comprising:
an adjusted counts database coupled to the run-time correction module, where the adjusted counts database stores values smoothed C'(xy) for contexts xy, where the counts in raw form for contexts xy are mathematically adjusted so the normalization the probability estimate is readjusted.

13. A method for a speech recognition system, comprising:
improving an accuracy of probability estimates of how linguistically likely a sequence of linguistic items are to occur in that sequence from an underlying statistical language model by adding a correction module trained on different or more extensive data than the underlying statistical language model, in which the correction module systematically corrects the statistical language model estimates, where those probability estimates from the statistical language model significantly disagree with evidence available to the correction module;

identifying all special N-grams (Yz) those for which the probability estimate P(z|Y) from the statistical language model is implausible given actual counts of C(Yz) and C(Y) that have been identified and recorded in a count database, where z is a specific linguistic unit that occurs in a given context of Y and Y is a specific sequence of one or more of other linguistic units;

establishing a threshold value (t) to determine whether the evidence available to the correction module being a difference in the observed counts in the count database C(Yz) from an estimated amount of counts of the N-gram context of Yz in a background training data derived from the underlying statistical language model E(Yz);

in response to a request from a decoder module of the speech recognition system, the correction module returning estimates from the statistical language model with a normalization factor applied to those estimates when an actual number of counts of the N-gram context of Yz in the corpus of specific text analyzed by the correction module C(Yz) are not significantly different, by being within the threshold value t, from the estimated amount of counts of the N-gram from the statistical language model; and in response to a request from a decoder module of the speech recognition system, the correction module returning for each special N-grams (Yz), a corrected probability estimate associated with that special N-gram based on counts of the linguistic sequence found in the count database when the actual number of counts of the N-gram sequence of Yz in the corpus of text analyzed by the correction module C(Yz) are significantly different from the estimated amount of counts of the N-gram from the statistical language model, and discarding then the statistical language model's returned probabilities.

14. The method of claim 13, wherein the correction module returns corrected probability estimates for each special N-gram of Yz based on a smoothed count of C'(Yz) divided by a smoothed count of C'(Y), where the smoothed counts mathematically readjust the probability estimate associated with that special N-gram so the returned corrected probability estimate are neither assigned a zero percent probability nor have numeric value which was divided by the number zero, and the underlying statistical language model is a general corpus statistical language model in which the correction module trained to a specific domain systematically corrects the general corpus statistical language model estimates, where those probability estimates from the statistical language model significantly disagree with the linguistic probabilities in that domain.

15. The method of claim 14, wherein the threshold value t is determined by using a 95% Poisson Distribution model and the smoothed counts are generated with a frequency of frequencies table.

16. The method of claim 13, wherein during a training phase of a speech recognition system, generating the normalization factor because the correction module identified that certain sequences of linguistic items are more frequently used in the corpus of text analyzed by the correction module than in the background training data used for the underlying statistical language model and the probabilities coming from the statistical language model are normalized in light of the context of the corpus of text analyzed by the correction module, wherein the special N-grams Yz contains three or more linguistic items in a sequence and are stored along with the actual counts of the number of times that N-gram appeared in the corpus of domain specific text analyzed, and the units of the linguistic items are either words, word phrases, or a combination of both, and the correction module is trained to take account of larger contexts when estimating probabilities from the underlying statistical language model as well as compensate for inaccuracies in a probability-smoothing algorithm used by the underlying statistical language model.

17. The method of claim 16, wherein the statistical language correction module merely identifies special N-gram of Yz by evaluating only sequences of Y which have counts C(Y) greater than one (>1) in addition to being greater in difference than threshold value (t).

18. A continuous speech recognition system over a network, comprising:
a continuous speech recognition engine that includes
front-end filters and sound data parsers configured to convert a supplied audio file of a continuous voice communication, as opposed to a paused voice command communication, into a time coded sequence of sound feature frames for speech recognition,
a speech recognition decoder module having an input to receive the time coded sequence of sound feature frames from the front-end filters as an input, where the speech recognition decoder module applies a speech recognition process to the sound feature frames and determines at least a best guess at each recognizable word that corresponds to the sound feature frames,
a user interface of the continuous speech recognition system has an input to receive the supplied audio files from a client machine over the wide area network and supply the supplied audio files to the front end filters, a general-corpus statistical language model that provides probability estimates of how linguistically likely a sequence of linguistic items are to occur in that sequence based on an amount of times the sequence of linguistic items occurs in text and phrases in general use, wherein the speech recognition decoder module requests a run-time correction module for one or more corrected probability estimates P'(z|xy) of how likely a linguistic item z follows a given sequence of linguistic items x followed by y; where x, y, and z are three variable linguistic items supplied from the decoder module, and the decoder module has an input to receive back the one or more domain correct probability estimates from the run-time correction module for one or more possible linguistic items z that follow the given sequence of linguistic items x followed by y, a first input in a run-time correction module configured to receive requests from the decoder module to return the one or more domain correct probability estimates for the one or more possible linguistic items z that could follow the given sequence of linguistic items x followed by y, wherein the run-time correction module is trained to linguistics of a specific domain, and is located in between the speech recognition decoder module and the statistical language model in order to adapt the probability estimates supplied by the general-corpus statistical language model to the specific domain when those probability estimates from the general-corpus statistical language model significantly disagree by at least an established criterion based on a statistical test with the linguistic probabilities in that domain, a second input in the run-time correction module configured to receive from the statistical language model one or more probability estimates P(z|xy) of how likely are each of the possible linguistic items z that could follow the given sequence of linguistic items x followed by y, an output in the run-time correction module to return to the decoder module one or more domain corrected probability estimates P'(z|xy) of how likely are each of the possible linguistic items z that could follow the given sequence of linguistic items x followed by y;

an output module of the speech recognition system configured to provide a representation of what uttered sounds and words were inputted into the speech recognition system based on the domain corrected probability estimates; and a server to host the continuous speech recognition engine.

19. The continuous speech recognition system of claim 18, further comprising:

a database to store each word from the output module with an assigned robust confidence level parameter and a start and stop time code from that word;

an intelligence engine configured to assign a higher weight to recognized words with a robust confidence level above a threshold than recognized words below the threshold, and use the weight for the recognized words when queries are made with the user interface;

a special N-gram repository coupled to the run-time correction module, where the special N-gram repository acts as a repository to store all special N-grams, sequences of linguistic items xyz, that have significantly different counts/occurrences in the corpus of domain specific text analyzed than would be expected compared to a background training data from the general-corpus statistical language model indicative of text phrases in general use, where the special N-grams (xyz) are three or more linguistic items in that sequence and are stored along with the actual counts of the number of times that N-gram appeared in the corpus of domain specific text analyzed, and the special N-gram repository when queried with a linguistic sequence of xyz returns whether the N-gram xyz is included in the repository database and the observed counts associated with that special N-gram (xyz);

the domain specific count database coupled to the run-time correction module, where the count database returns the linguistic sequences of xy, the N-gram (xyz), and the observed counts of both C(xy) and C(xyz) in the corpus of domain-specific text analyzed when requested by the run-time correction module, but is not itself modified either during a training time or at run time; and a statistical language correction module that uses the established criterion based on the statistical test to determine whether a difference in the observed counts in the domain specific count database of sequences of linguistic items x, y and each of the possible linguistic items z are in fact significantly different from an estimated amount of counts of that same linguistic sequence xyz derived from the general use statistical language model, wherein the units of the linguistic items xyz are words, word phrases, or a combination of both.

20. The continuous speech recognition system of claim 19, further comprising:

a Phi database of normalization values coupled to the run-time correction module, where the Phi database of normalization values stores normalization values Phi(xy) for contexts of given linguistic items x followed by y for each possible z, wherein the Phi database applies a mathematical factor to correct the count data in raw form from a domain specific count database to have normalizes probabilities so the sum for the set of all returned possibilities for z is equal to one hundred percent, in response to a query from the decoder module, the run-time correction module first determines whether each possibility of the linguistic sequence xy and z is a special N-gram listed in the special N-gram repository or not, and when the sequence of linguistic items xyz is a special N-gram, then the correction module generates a corrected probability estimate directly from the observed counts in that domain and discards the predictions from the general-corpus statistical language module for that xyz possibility, and when the special N-gram xyz is not in the special N-gram repository, then the run-time correction module applies a normalization factor to estimates from the statistical language model.

* * * * *